March 23, 1937.  J. R. ALLAN ET AL  2,074,317
RECIRCULATING AIR SYSTEM FOR DUST REMOVAL
Filed June 29, 1934  3 Sheets-Sheet 3
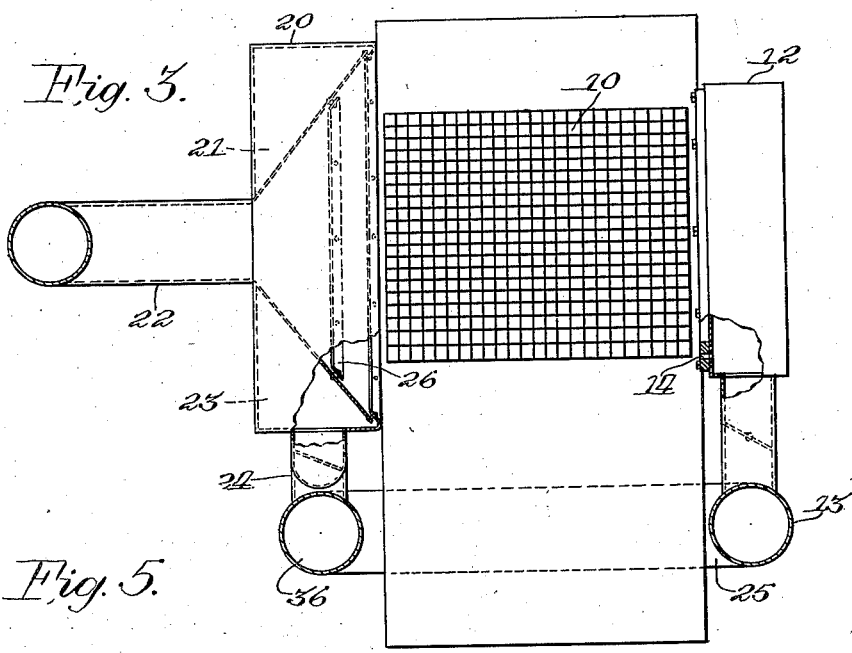
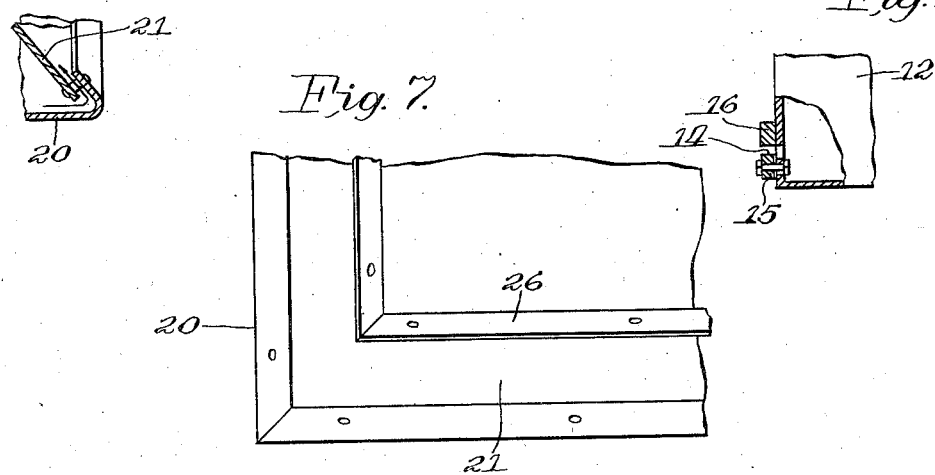
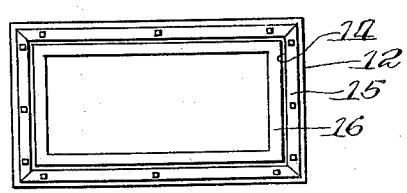
Inventors
James R. Allan
and Frank H. Amos
By
Atty.

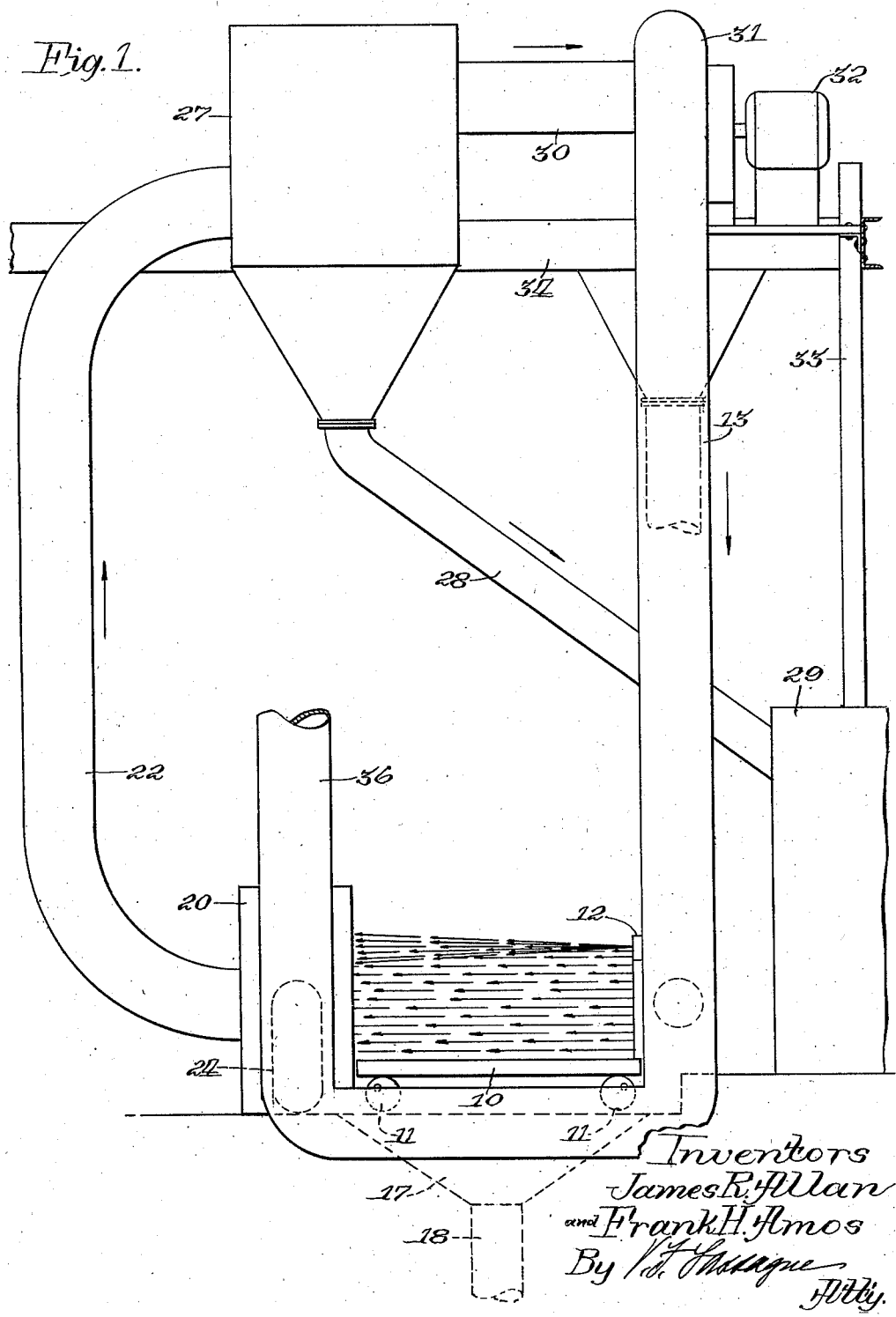

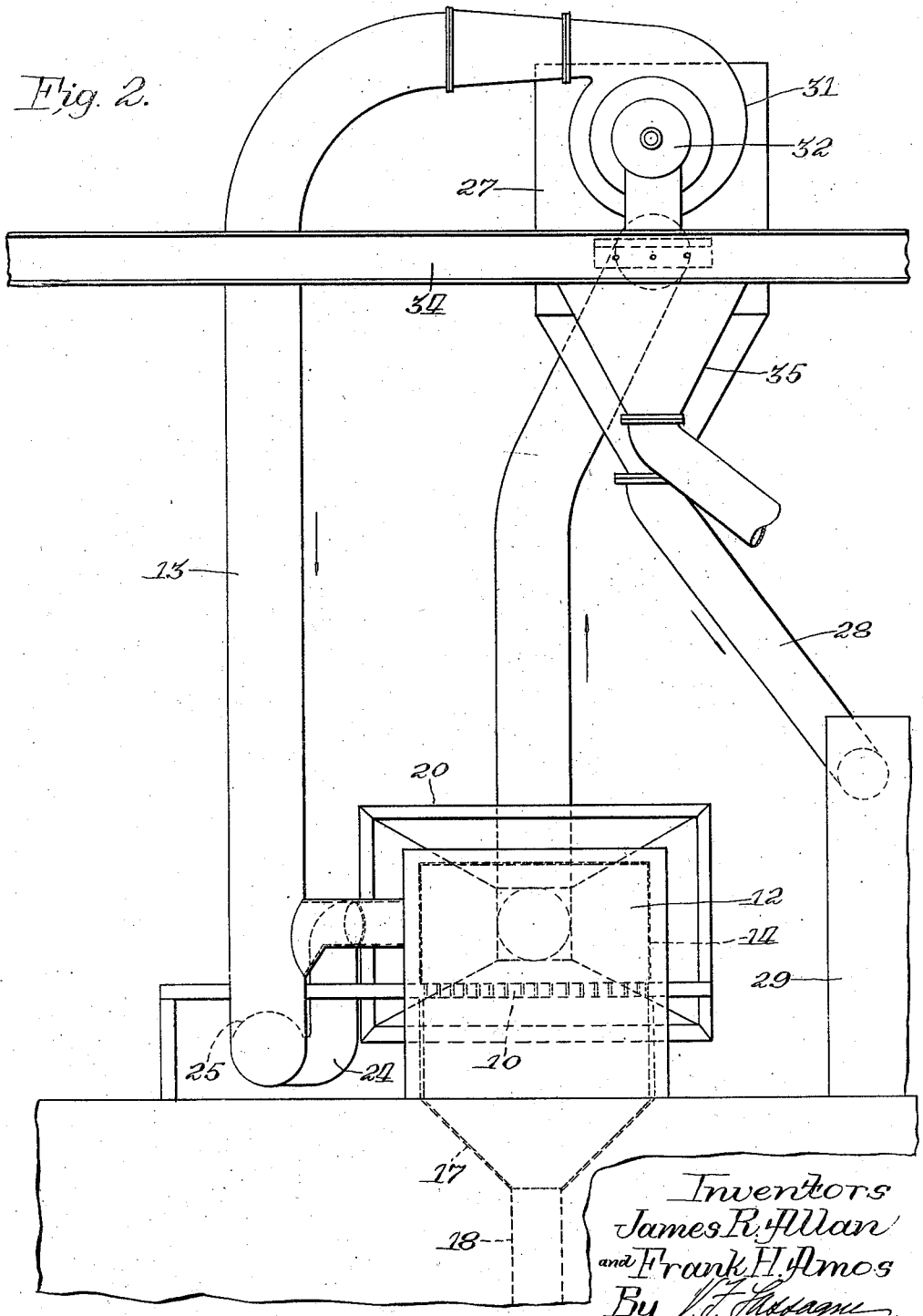

Patented Mar. 23, 1937

2,074,317

UNITED STATES PATENT OFFICE 2,074,317

RECIRCULATING AIR SYSTEM FOR DUST REMOVAL

James R. Allan, Oak Park, and Frank H. Amos, Chicago, Ill., assignors to International Harvester Company, a corporation of New Jersey Application June 29, 1934, Serial No. 733,026

5 Claims. (Cl. 98—36)

This invention relates to a gaseous circulation system for confining dust laden or otherwise contaminated gas within a predetermined zone and for removing the gases from said zone. More specifically, it relates to a recirculating air system particularly adapted for use in foundries to remove the dust liberated in the operation of mold shake-outs.

In a great many industrial operations, gases containing dust or other constituents injurious to workmen are liberated during the carrying out of certain processes. The nature of certain work is such that it is very difficult to confine the contaminated gases within a given zone. It is often difficult to prevent the contaminated gases from spreading to other parts of the plant. A particularly bad situation exists in the foundries where certain operations, particularly the shaking out of molds, generates a dust which contaminates not only the air around the shake-out device, but usually around the entire foundry. It is particularly in connection with this problem that applicants have devised the system forming the subject-matter of this application.

Heretofore when attempts have been made to reduce the dust hazard around mold shake-outs, the exhaust system has been resorted to. Usually the molds have been shaken out over a grating above a conveyer system, and downward suction of air has been employed in an attempt to remove the dust radiated from lifting the cope and castings from the mold. However, it has been found that a straight exhaust system is very ineffective for this type of work because exhaust systems are effective only within a few inches of the face of the exhaust conduit, requiring the use of a great amount of air and power. As molds have considerable depth and, as the dust is distributed around the molds during the shaking-out process, this method has not been very effective in removing the injurious dust laden atmosphere. There is another factor; namely, the heat in the hot castings, which counteracts the exhaust effect by creating air currents in an upward direction, which carry entrained therewith the dust freed during the shaking-out process.

The object of the present invention is to provide an improved system for removing dust laden or otherwise contaminated gases from a zone in which they are freed or generated. Another major object is to confine the contaminated gases within a predetermined zone by a novel means. Another more specific object subsidiary to the other above objects is to provide a system which may be identified as a push-pull system in which circulation across a given zone is accomplished by jets of air under pressure at one side of the zone and suction or exhaust means at the other side of the zone. Another object subsidiary to the confining of contaminated air is to provide an air curtain for confining purposes, whereby vision into the zone is unobstructed and whereby materials may be moved into and out of the zone without substantial effect on the confining of the contaminated air within the zone.

The above objects and others which will be pointed out in the description to follow are accomplished by a special device or circulation system. As the disclosure is particularly concerned with a mold shake-out, the description will be limited in terms of such a device. However, it is to be understood that the system is applicable wherever dust laden or otherwise contaminated or hot gases are generated or exhausted in any type of operation.

In order to obtain an air curtain, which is one of the principal features of applicants' system, air is delivered under considerable pressure through a narrow slot or through closely adjacent openings completely surrounding the dust zone in streams with the individual air particles projecting substantially parallel to the platform or base of the dust zone. The thickness dimensions of the stream have been carefully worked out along with the pressure to obtain a very high velocity of air flow which may vary from 6,000 to 20,000 lineal feet per minute. It has been found that an air stream of this nature deflects from the straight line in which it is projected due to the natural angle of expansion about 7 degrees from the line of projection. With high velocities it is, therefore, possible to project an air curtain for a considerable distance without loss of velocity or spreading of the stream sufficiently to lose its additional force. To complete the essential elements of the device, a receiving means in the nature of a hopper is positioned with an outlet substantially larger than the outside dimension of the air stream at the distance from the discharge end at which the hopper is positioned. A large, powerful fan is utilized with sufficient capacity to remove all of the air from the hopper delivered thereto by the air curtain, and the air entrained therewith on both sides of the stream. There is also sufficient excess capacity in the exhaust side of the system to remove gases from within the air curtain in which the generated dust and heat are carried. The exhausted air is delivered to a dust removing means and a portion, which is given additional cleaning treatment, is returned to the pressure chamber completing the recirculating system. The basic construction of applicants' device has been above described. A system embodying this device is shown in the attached drawings, in which:

Figure 1 is an elevation somewhat diagrammatic, showing a grating for mold shake-out purposes around which a system has been built incorporating applicants' recirculating dust collecting means;

Figure 2 is an end elevation of the construction shown in Figure 1;

Figure 3 is a top plan view of the construction shown in Figure 1 with certain portions broken away in section to show the gas discharging and receiving means;

Figure 4 is an enlarged detail of the jet or slot which forms the means for projecting the air curtain;

Figure 5 is an enlarged sectional detail of the receiving end of the device which incorporates a pressure jet for entraining the gases delivered to that end of the device; and, Figure 6 is an enlarged detail in vertical plan, showing the discharge slot at the pressure chamber end of the device.

As illustrated in diagrammatic form, a shaker grating 10 is mounted on eccentric rollers 11 for shaking or agitating a mold placed thereon for removing the casting from the mold. Any type of shake-out grating, such as the form utilizing pneumatic vibrators, may be utilized, and, in so far as the broader aspects of the invention are concerned, the grating 10 may be replaced by any means from which a dust laden or contaminated gas is generated. At one end of the grating 10, an air pressure chamber 12 is located extending laterally somewhat beyond the grating 10. Said chamber receives air under pressure from a conduit 13, the direction of flow being indicated by arrows in Figures 1 and 2. Around the face of the chamber 12 at the sides and across the top, a substantially continuous slot 14 is formed. At the edges, said slot is reinforced by bars 15 and 16, one of said bars being adjustable, as shown in Figure 4, to control the width of the slot, thereby determining the thickness of the air stream projected therefrom.

Pressure is maintained in the chamber 12 sufficient to provide an air stream of the required velocity, which may vary depending upon the length of the platform 10 from 6,000 to 20,000 lineal feet per minute. The width of the slot is regulated in accordance with the pressure provided to produce an air stream, which has a narrow angle of expansion from the projected line. It has been found that this angle is about 7 degrees in devices which have been constructed. The diffusion of the air stream with this small angle of expansion is not great and may be carried over a platform or grating of substantial length. It will be understood that the air curtain formed by the projected stream of air completely encloses the platform at the sides and over the top thereof, forming an arched enclosure. A hopper 17 may be provided beneath the platform 10 to receive sand and other materials therefrom and convey it downwardly through the conduit 18.

At the end of the platform 10 opposite the pressure chamber 12, a receiving chamber 20 is located. Said chamber is formed internally with a receiving hopper 21 having walls tapered to a central outlet conduit 22. The hopper 21 is substantially greater in dimensions, both laterally and vertically, than the pressure chamber 12 to take care of the expansion of the air stream and to receive also a certain amount of the air carried along by friction at the outside of the air stream. A sufficient suction is maintained on the conduit 22 to remove substantially all of the air projected by the air curtain without building up any substantial pressure. The exhaust capacity is also sufficient to withdraw the contaminated air confined over the platform or grating within the air curtain and also to withdraw additional air projected around the edge of the hopper 20 for assisting in removing the air projected into the hopper by the air curtain.

Between the hopper 21 and the walls of the receiving chamber 20, a compartment 23 is formed. Said compartment receives air under pressure through a conduit 24 connected by a conduit 25 with the air pressure conduit 13. From the chamber 23 the air is projected in flat streams along the sides of the hopper 21, as shown in Figure 3 and by an arrow in Figure 5. Said high velocity stream entrains the air coming in contact therewith and assists in carrying it to the exhaust conduit 22. A baffle wall 26 mounted around the hopper 21 in spaced relation thereto is provided for diffusing the air projected along the hopper wall and assisting in carrying the air within the hopper to the exhaust conduit.

The exhaust conduit 22 leads to a separating chamber 27 in which a majority of the sand and heavy particles are removed. Said material is conducted downwardly through a conduit 28 to a receptacle 29. From the chamber 27 the partially purified air is conducted through a conduit 30 to a fan 31. As illustrated, the fan 31 is of the centrifugal type, being driven by an electric motor 32. To better illustrate the system, a portion of a frame structure has been shown including an upright member 33 and a horizontal member 34 on which the motor 32 and the fan 31 are mounted.

The fan 31 illustrated is of a special design now in commercial use, which incorporates means for centrifugally removing dust and moisture from the air handled by the fan. As illustrated, this dust is received in a receptacle 35. It is to be understood that this particular construction does not form a particular essential of the present invention, being illustrated to indicate additional means for removing dust from the air recirculated in the system. The cleaned air from the fan 31 is delivered to the pressure conduit 13 previously referred to.

The operation of the device as above described has been explained along with the description. An air curtain produced as above described has been found in actual practice to be effective for confining substantially all of the dust, moisture, and hot gases produced in a mold shake-out operation. When high velocities are used, large and heavy particles will not pass through the air curtain, but are entrained and carried thereby into the receiving hopper, as illustrated. The exhaust system has sufficient capacity to continually withdraw air from within the dust zone as confined by the air curtain, as well as withdrawing the air projected in the air curtain and the air projected around the hopper wall to facilitate circulation. It is obvious that with the withdrawal of additional air from within the air curtain and as entrained at the outside of the air curtain, there is a continuous additional amount of the air in the system. It is, therefore, necessary to continually exhaust a percentage of the air from the system. This may be done by a conduit 36, as illustrated in Figure 3, the amount of air exhausted from the system being determinable by the pressures therein at different locations. Air exhausted from the conduit 36 may be conducted to a dust arrester of sufficient capacity to remove any injurious particles therefrom.

Although this invention has been described in connection with a mold shake-out, it is to be understood that it may be used wherever contaminated or hot gases are produced and its operation for such uses is substantially the same as above described. Applicants contemplate as their invention all modifications falling within the scope of the appended claims.

What is claimed is:

1. A gas system comprising a horizontal platform in the open atmosphere on which an operation is performed producing gases which are to be segregated, a pressure chamber mounted at one side of the platform, means for delivering a thin substantially continuous air jet from the sides and top of said chamber forming thereby an air curtain extending along the sides and above the top of the platform, a receiving chamber positioned alongside the platform opposite the pressure chamber, said chamber being of a size sufficient to receive substantially all of the projected air allowing for its normal expansion from the projected line, and means for withdrawing gases from the receiving chamber.

2. A dust collecting system comprising a platform on which a dust generating operation is performed, a pressure chamber mounted at one side of the platform, means for delivering a thin substantially continuous air jet from the sides and top of said chamber forming thereby an air curtain extending along and above the platform, a receiving chamber positioned alongside the platform opposite the pressure chamber, said chamber being of a size sufficient to receive substantially all of the projected air allowing for its normal expansion from the projected line, and means for withdrawing air from the receiving chamber.

3. A gas collecting system for an open platform on which an operation is performed producing gases which are to be segregated, comprising means positioned at one side of the platform for projecting in a horizontal direction a continuous arch-shaped air curtain extending upwardly from the platform level at each side and over the top thereof, and means positioned at the opposite side of the platform for receiving substantially all of the projected air whereby a space enclosed against the escape of gases is obtained, open for the introduction and removal of material from the top and from two opposite directions at platform level.

4. A gas collecting system for an open platform on which an operation is performed producing gases which are to be segregated, comprising means positioned at one side of the platform for projecting in a horizontal direction a thin continuous arch-shaped air curtain extending upwardly from the platform level at each side and over the top thereof, and means positioned at the opposite side of the platform for receiving substantially all of the projected air which maintains a velocity sufficient to pass over the platform whereby a space enclosed against the escape of gases is obtained for carrying on an operation, open for the introduction and removal of material from the top and from two opposite directions at platform level.

5. A gas collecting system for an open platform on which an operation is performed producing gases which are to be segregated, comprising a casing to which air is supplied under pressure positioned at one side of the platform, said casing being provided with a narrow slit on the platform side for projecting in a horizontal direction a continuous arch-shaped air curtain reaching from the platform level at each side and over the top thereof, and a casing positioned at the opposite side of the platform provided with an opening facing the air projecting slit for receiving substantially all of the projected air which maintains a velocity sufficient to pass over the platform whereby a space enclosed against the escape of gases is obtained for carrying on an operation, open for the introduction and removal of material from the top and from two opposite directions at platform level.

JAMES R. ALLAN.
FRANK H. AMOS.